United States Patent [19]

Take et al.

[11] 4,229,080
[45] Oct. 21, 1980

[54] ADDITIONAL ELECTRODE OF ELECTROCHROMIC DISPLAY AND REFRESHING METHOD FOR THE SAME

[75] Inventors: Hiroshi Take; Katubumi Koyanagi, both of Tenri; Hisashi Uede, Yamatokoriyama, all of Japan

[73] Assignee: Sharp Kabushiki Kaisha, Osaka, Japan

[21] Appl. No.: 918,416

[22] Filed: Jun. 23, 1978

[30] Foreign Application Priority Data

Jun. 29, 1977 [JP] Japan .................. 52-78111
Aug. 18, 1977 [JP] Japan .................. 52-99251
Sep. 26, 1977 [JP] Japan .................. 52-116211

[51] Int. Cl.$^3$ ................................ G02F 1/17
[52] U.S. Cl. ...................... 350/357; 340/785
[58] Field of Search ........... 350/357; 340/763, 785

[56] References Cited
U.S. PATENT DOCUMENTS 4,123,841  11/1978  Yano et al. .............. 350/357 X

*Primary Examiner*—James W. Davie
*Attorney, Agent, or Firm*—Birch, Stewart, Kolasch & Birch

[57] ABSTRACT

An additional electrode is provided for developing a secondary electrochromic phenomenon on a counter electrode apart from the major electrochromic phenomenon which is developed between one or more display electrodes and the counter electrode. Current flows from an additional electrode to the counter electrode in developing the secondary electrochromic phenomenon. Coloration of the counter electrode, where the magnitude of an overvoltage of the counter electrode is small is stabilized to thereby enhance electronic properties of the electrochromic display. The material of the additional electrode is selected from metals having an appropriate ionization tendency with respect to an electrolyte, such as Mg, Al, Zn, Cr, Fe, Ni, Sn, and Pb, or a combination thereof. Otherwise, the material of the additional electrode is selected to be an inert material with respect to the electrolyte such as Ag, Au, Pt, Pd, $In_2O_3$, and $SnO_2$ or a combination thereof. The combination which is composed of both the appropriate ionization tendency metals and the inert metals can be available for the additional electrode. The electrochromic display can be controlled under one of several groups of driving techniques consisting of a potentiostatic driving, a constant current driving, and a constant voltage driving method.

13 Claims, 23 Drawing Figures

ADDITIONAL ELECTRODE OF ELECTROCHROMIC DISPLAY AND REFRESHING METHOD FOR THE SAME

BACKGROUND OF THE INVENTION

The present invention relates to an electrochromic display and, more particularly, to a construction of an electrochromic display and a driving method for the same.

There are well known driving methods for an electrochromic display (referred to "ECD" hereinbelow) comprising a pair of substrates, a display electrode and a counter electrode each including an electrochromic material, and an electrolyte filled between the substrates. The driving method is classfied into three groups comprising a potentiostatic driving, a constant current driving, and a constant voltage driving method.

With respect to the ECD comprising the electrochromic material as a reactive material, the following problems exist:

(1) A balance voltage and an overvoltage of the electrochromic material are varied in accordance with a shade of color of the same. With an increase in the coloration intensity of the electrochromic material, the balance voltage is lowered and then the overvoltage is also decreased. Even if a constant voltage is applied to the ECD, current flowing through the ECD is varied in accordance with the shade of color of the electrochromic material. The required shade of color of the display electrode can not be obtained.

(2) There is a tendency that the counter electrode will be restored to its bleached state when the EC material on the counter electrode is colored and driving is halted for a long period. Although the ECD is said to have a memory effect, the colored state will, in effect, be debilitated little by little over a period of time. Should the driving conditions be proper, it will become more difficult to conduct current for the above mentioned reasons. The electro-optical performances of the ECD, therefore, will degrade in spite of non-degradation of the EC material itself.

OBJECTS AND SUMMARY OF THE INVENTION

With the foregoing in mind, it is a primary object of the present invention to provide a novel structure of an electrochromic display for enhancing electro-optical properties of the electrochromic display.

It is another object of the present invention to provide a novel additional electrode for the electrochromic display comprising a display electrode, a counter electrode, and a reference electrode, if necessary.

It is still another object of the present invention to provide a novel driving method for the electrochromic display using the additional electrode in addition to the display electrode, the counter electrode, and the reference electrode, if necessary.

It is further object of the present invention to provide a novel driving method of the electrochromic display, whereby current flows from the additional electrode to the counter electrode thereby stabilizing the color gradation of the counter electrode in order to enhance the electro-optical properties of the electrochromic display.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an additional electrode is provided, in addition to a display electrode, a counter electrode, and a reference electrode, and is included within an electrochromic display, if necessary. Current flows from the additional electrode to the counter electrode so that an electrochromic material of the counter electrode is colored maintaining stability. In other words, the decrease in the gradation of the electrochromic material of the counter electrode can be compensated for by utilizing the additional electrode.

It is preferable that materials of the additional electrode be selected from an inert material with respect to an electrolyte of the electrochromic display, a metal of appropriate ionization tendency with respect to the electrolyte, or a combination comprising the preceding inert materials and/or matals. The inert material includes, for example, Ag, Au, Pt, Pd, $In_2O_3$ and $SnO_2$. The appropriate ionization tendency metal comprises Mg, Al, Zn, Cr, Fe, Ni, Sn and Pb.

A conductive layer can be formed under the additional electrode, the conductive layer having smaller ionization tendency than the additional electrode.

Electro-optical properties of the electrochromic display are enhanced by either short-circuiting the additional electrode to the counter electrode or applying a constant voltage therebetween. Current is supplied by the preceding driving method so that the electrochromic material of the counter electrode is electrochemically improved.

In the electrochromic display including the reference electrode, current flows from the additional electrode to the counter electrode so that the counter electrode can be held at a constant potential relative to the reference electrode.

In driving the electrochromic display, the two driving methods are carried out preferably after the application of power is initiated or immediately before an indicated display is changed, for increasing the electro-optical properties of the electrochromic display.

In addition, the electrochromic display of the present invention can be driven in accordance with only one of three driving methods, namely, a potentiostatic driving method, a constant current driving method, and a constant voltage driving method.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

The present invention can be used with any driving methods for an electrochromic display (referred to "ECD" hereinbelow), such as a potentiostatic driving, a constant current driving, and a constant voltage driving method. These driving methods are well known in principle to those skilled in the art. For example, these drivings are summarized in U.S. patent application Ser. No. 896,591 entitled "COMPLETE BLEACHING IN ELECTROCHROMIC DISPLAY DRIVE" filed on Apr. 14, 1978 by Hiroshi HAMADA et al and assigned to the assignee of the present invention, the disclosure of which is incorporated herein. The corresponding German Patent Application was filed on Apr. 18, 1978 as No. P 28 16 837.8.

EXAMPLE 1

Figure 1A:
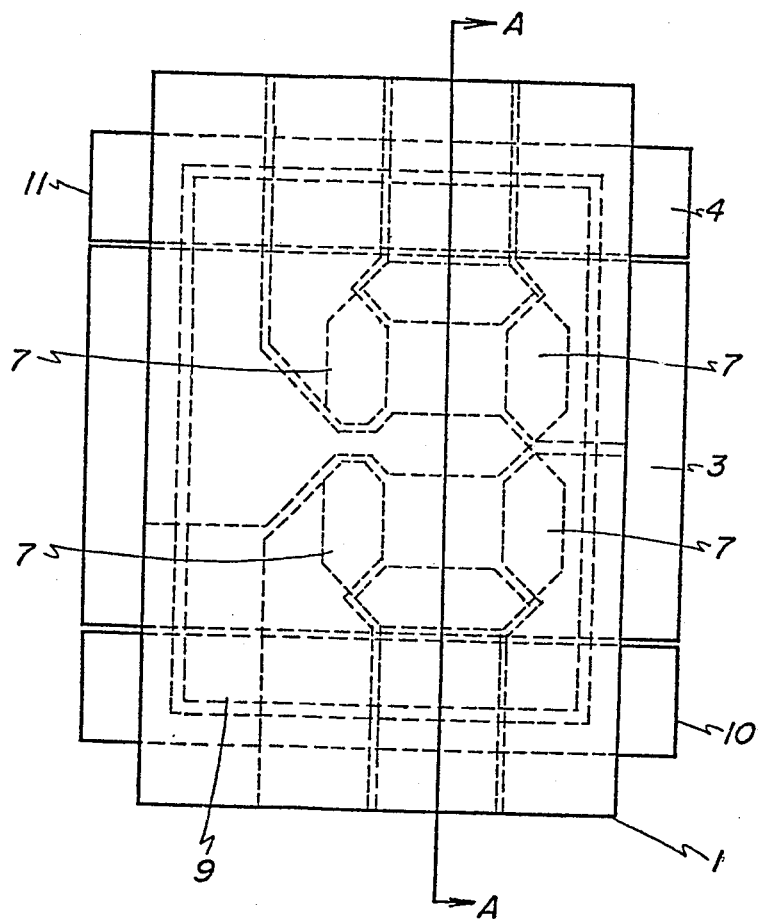
FIGS. 1(A) and 1(B) are a plan view of an electrochromic display according to the present invention and a sectional view taken on the line A—A of the same, respectively.
Figure 1:
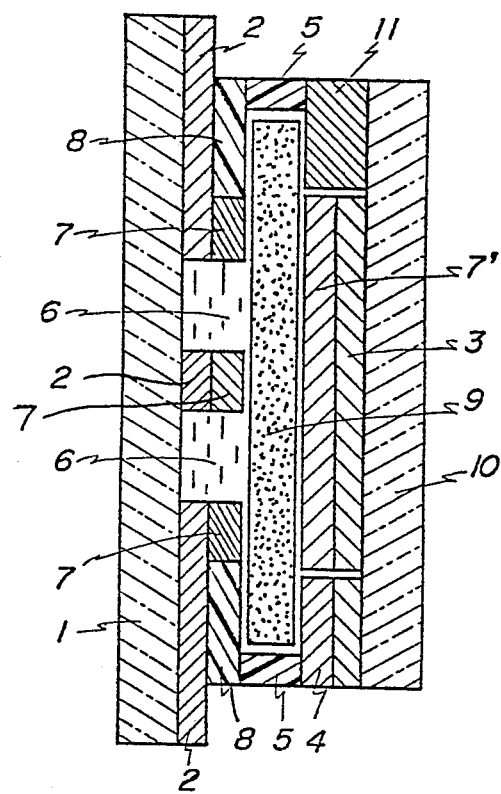

FIGS. 1(A) and 1(B) show an ECD according to the present invention in a plane view and a sectional view taken on the line A—A of the plane view, respectively. The ECD of the present invention comprises a pair of glass substrates 1 and 10, a conductive, transparent electrode 2 such as indium oxide ($InO_2$) thereon, an electrochromic layer 7 which comprises a preferred electrochromic material such as tungsten oxide ($WO_3$). The electrochromic layer 7 is deposited by vacuum evaporation, although other processes such as sputtering, electrochemical deposition, spray or silk screening may be available. A display electrode consisting of the conductive, transparent electrode 2 and the electrochromic layer 7, is patterned for indicating any desired images, for example, characters and symbols.

The conductive, transparent electrode 2 is 2,000 Å thick and is formed by electron beam evaporation to have a sheet resistivity of 20Ω/sq. The electrochromic layer 7 is 5,000 Å thick under the condition that a substrate therefor is heated at 350° C.

A protective layer 8 is formed with 5000 Å in thickness in accordance with vacuum evaporation techniques. The protective layer 8 made of, for example, $SiO_2$ is provided for protecting for the display electrode. A conductive layer 3 made of Ni is provided on the glass substrate 10. A reference electrode 4 made of Ni is also formed. The reference electrode 4 is required for the potentiostatic driving method and reading-out memory conditions by detecting a stored voltage in the ECD. The sheet resistivity of the conductive layer 3 and the reference electrode 4 is preferably 2Ω/sq.

An additional electrode 11 is provided by evaporation techniques with a thickness of 1 μm, the additional electrode 11 being made of Al. The area of the additional electrode 11 is approximately one fourth the area of the conductive layer 3. An electrochromic layer 7' is deposited on the conductive layer 3 by the vacuum evaporation to be similar to the other electrochromic layer 7. A spacer 5 is provided for placement of the glass substrates 1 and 10. The spacer 5 is a glass stick of 1 mm quadrilateral. A counter electrode consists of the conductive layer 3 and the electrochromic layer 7'.

The additional electrode 11 may be deposited at any portion of the ECD, especially, on the same glass substrate 1 which supports the display electrode, in accordance with the design requirement.

The material of the additional electrode 11 is selected to be an inert material relative to the electrolyte or have an appropriate ionization tendency relative to the electrolyte. Upon the application of a power voltage, current flows between the counter electrode and the additional electrode in accordance with the reaction of the electrolyte. The inert material is not soluted into the electrolyte without any change thereof. Upon application of the power voltage, the additional electrode 11 is soluted into the electrolyte to start supplying current to the counter electrode. The additional electrode 11 includes a material of an appropriate ionization tendency relative to the electrolyte. The inert material comprises Ag, Au, Pt, Pd, $In_2O_3$, and $SnO_2$. The material of the appropriate ionization tendency includes Mg, Al, An, Cr, Fe, Ni, Sn, and Pb. A combination comprising the inert materials and/or the appropriate ionization tendency materials can be useful to implement the additional electrode.

A porous means 9 is attached directly to the electrochromic layer 7 to overlay the electrochromic layer 7'. The porous means 9 is selected to be a porous and white plate such as a porous ceramic plate. An electrolyte 6 is filled in a cavity of the ECD. The electrolyte 6 is impregnated into the porous means 9 before sealing the ECD. The electrolyte 6 is 1.0 M $LiCl_4O_4$ γ-Butyrolacton. Before the activation of the thus-composed ECD, to achieve initial stability of the ECD, current is conducted by short-circuiting the conductive layer 3 to the additional electrode 11. The current supply is caused by a potential difference between the materials of Al and $WO_3$ so that the electrochromic layer 7' formed on the conductive layer 3 of the counter electrode is colored. Current is exhausted in several hours. Therefore, the electrochromic layer 7' is colored enough to have a low overvoltage.

By the words "the pre-activated condition of the ECD" it is meant that the ECD is just before shipment of an ECD or is about to be used again after a long period of separation. It is preferable that, when the ECD is under the pre-activated condition, the counter electrode including the conductive layer 3 be short-circuited with the additional electrode 11 in advance. In the case where the ECD is re-operated after long period of separation, it is preferable that a switch be provided for short-circuiting the counter electrode and the additional electrode 11 over several hours.

After attaining the initial stability of the ECD, good electro-optical properties are exhibited by the following driving methods.

(1) writing-in by using the potentiostatic driving method and bleaching by using the constant voltage driving method:

writing-in voltage: 0.7 V writing-in time: 500 msec
bleaching voltage: −2.5 V bleahing time: 1 sec. (substantial completion during 200 msec).

Figure 2:
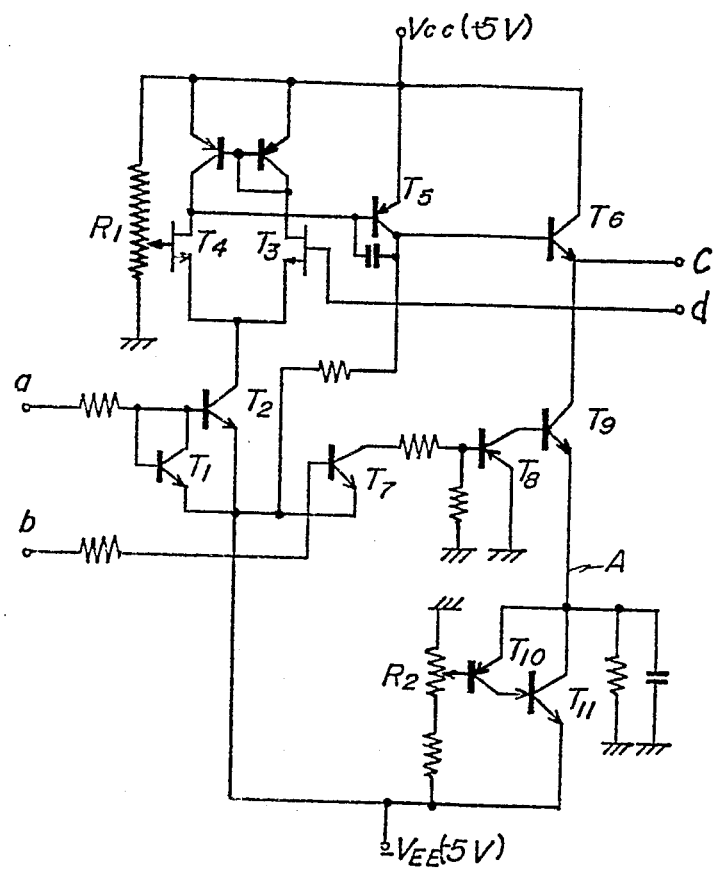
FIG. 2 is a circuit configuration of a driving circuit adapted to the electrochromic display of the present invention.

FIG. 2 shows a driving circuit used with the ECD of the present invention. A write signal is applied to a terminal a to turn-on switching transistors T1 and T2. A switching transistor T3 has an input terminal coupled to the reference electrode 4. A switching transistor T4 serves to control a write-in voltage through the use of a variable resistor R1. A differential amplifier comprises the switching transistors T3 and T4. The output of the driving circuit is applied to the counter electrode so that a write-in operation is affected according to the potentiostatic driving.

A bleach signal is provided to a terminal b to activate switching transistors T7 through T9 so that a bleach voltage is placed on a line A through the use of the switching transistors T10 and T11 and a variable resistor R2. The bleach voltage is applied to the counter electrode.

FIGS. 3(A) through 3(D) show graphical representations of the electro-optical properties of the ECD, before initial stabilization of the ECD followed by the writing-in by the potentiostatic driving and the bleaching by the constant voltage driving is affected. FIGS. 4(A) through 4(D) shows, on the other hand, the graphical representations of the electro-optical properties of the ECD, where the writing-in by the potentiostatic driving and the bleaching by the constant voltage driving is conducted after the initial stabilization of the ECD.

In FIGS. 3(A) through 3(D) and 4(A) through 4(D), the electro-optical properties of the ECD are plotted with time by second as abscissa. The writing-in by the potentiostatic driving for the ECD is effected during the period from "0" to "t1" and the memory effect of the ECD is retained during the period from "t1" to "t2", and the bleaching by the constant voltage driving for the ECD is conducted behind "t2".

Figure 3A:
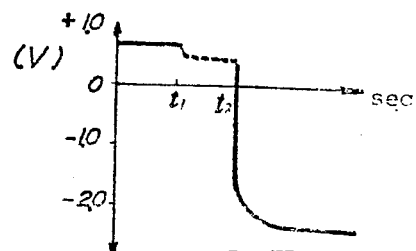
FIGS. 3(A) through 3(D) and FIGS. 5(A) through 5(C) are graphical representations of electro-optical properties of the electrochromic display, where a short-circuiting driving method of the present invention is not adapted to the electrochromic display before the activation of the electrochromic display will not be conducted.
Figure 4A:
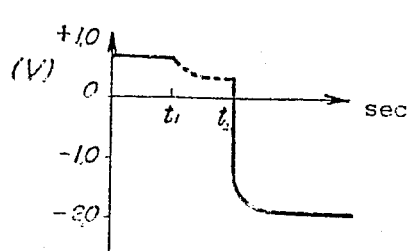
FIGS. 4(A) through 4(D) and FIGS. 6(A) through 6(C) are graphical representations of electro-optical properties of the electrochromic display, where the short-circuiting driving method of the present invention is adapted to the electrochromic display before the activation of the electrochromic display will be conducted.

In FIGS. 3(A) and 3(A), the electro-optical properties of the ECD are plotted with the potential difference by volt as ordinate. The potential difference is shown identical in the potentiostatic write driving regarding the electro-optical properties as shown in FIGS. 3(A) and 4(A). However, it will be noted that the potential difference shown in FIG. 4(A) is lower than that of FIG. 3(A).

Figure 3B:
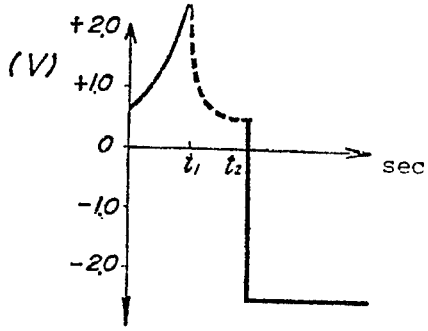
Figure 4B:
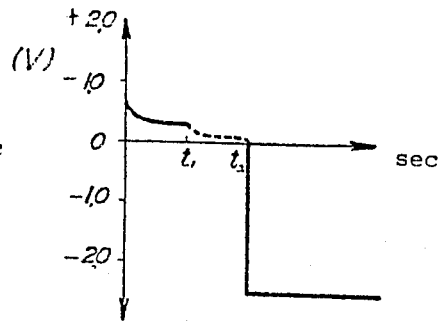

In FIGS. 3(B) and 4(B), the electro-optical properties of the ECD are plotted with the potential difference by volt as ordinate. It will be clearly noted that in FIG. 3(B) the potential difference is increased with the elapse of time.

Figure 3C:
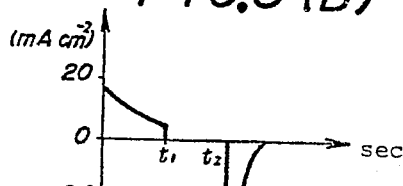
Figure 4C:
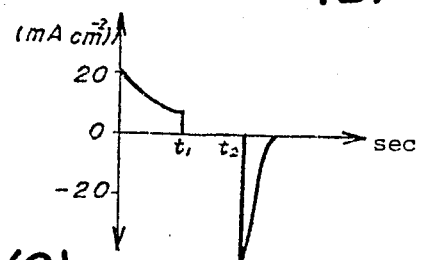

In FIGS. 3(C) and 4(C), the electro-optical properties of the ECD are shown with a current density by a unit of mA·cm$^{-2}$ as ordinate. It will be noted that the current density of FIG. 4(C) is greater than that of FIG. 3(C).

Figure 3D:
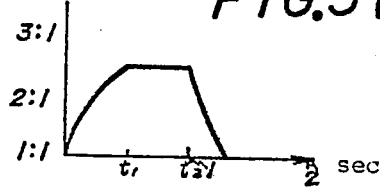
Figure 4D:
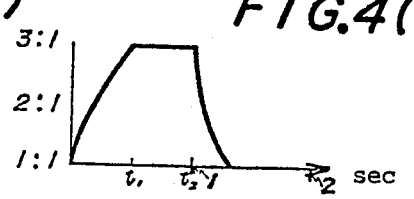

In FIGS. 3(D) and 4(D), the ordinate is contrast ratio under light of 590 mm wavelength. According to the present invention, the contrast ratio is increased to 3:1 with current of about 5 mC·cm$^{-2}$ as shown in FIG. 4(D), while the contrast ratio is increased to 2.5:1 at the termination of the writing-in and the duration of the memory effect of the ECD.

(2) writing-in by the constant voltage driving and bleaching by the constant voltage driving:

writing-in voltage: 0.5 V writing-in time: 500 msec
bleaching voltage: −2.5 V bleaching time: 500 msec (substantial completion during 200 msec).

Figure 5A:
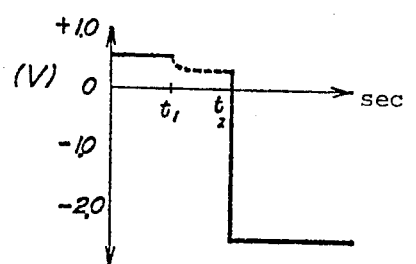
Figure 6A:
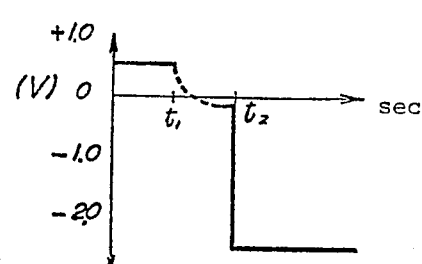
Figure 5B:
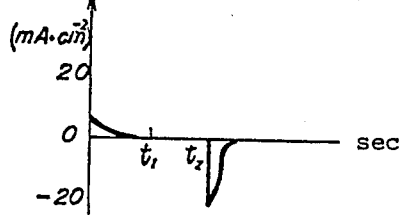
Figure 6B:
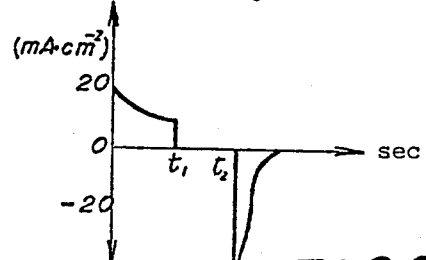
Figure 5C:
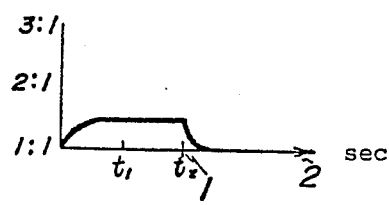
Figure 6C:
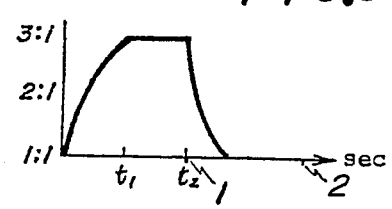

FIGS. 5(A) through 5(C) are graphical representations of the electro-optical properties of the ECD, where the writing-in by the constant voltage driving and the bleaching by the constant voltage driving are conducted without the initial stabilization of the ECD. FIGS. 6(A) through 6(C) are the graphical representations of the electro-optical properties of the ECD, on the other hand, where the writing-in by the constant voltage driving and the bleaching by the constant voltage driving are effected after the initial stabilization of the ECD has been conducted. The abscissas of FIGS. 5(A) to 5(C) and 6(A) to 6(D) represent time by second.

In FIGS. 5(A) and 6(A), the electro-optical properties of the ECD are plotted with the applied voltage by volt between the display electrode and the counter electrode. It will be noted that the variation of the applied voltage in the memory operation is increased in FIG. 6(A) in comparison with that of FIG. 5(A).

In FIGS. 5(B) and 6(B), the ordinate is the current density by a unit of mA·cm$^{-2}$. The current density rises in the writing-in and the bleaching as shown in FIG. 6(B) as compared to that of FIG. 5(B).

In FIGS. 5(C) and 6(C), the ordinate is plotted by the contrast density. The contrast density is increased to 3:1 with the current of about 5 mC·cm$^{-2}$ as shown in FIG. 6(C). On the other hand, the density is approximately 0.5:1 in FIG. 5(C).

EXAMPLE 2

Figure 7:
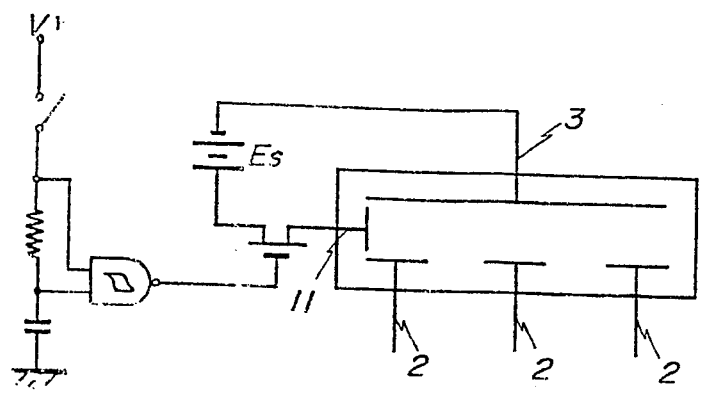
FIG. 7 is a circuit configuration of a driving circuit of the present invention, wherein current is conducted from an additional electrode to a counter electrode through the application of a constant voltage therebetween.

According to the ECD similar to that of Example 1, a constant voltage of 2.5 V is applied between the counter electrode and the additional electrode 11 before the activation of the ECD. Current above 20 mC·cm$^{-2}$ is conducted during one minute. The ECD reveals the electro-optical properties similar to Example 1. FIG. 7 shows a driving circuit for providing the initial stabilization of the ECD. In FIG. 7, the conductive layer 3, the additional electrode 11, the conductive, transparent electrode 2, and a constant power supplier Es of 2.5 V are shown. When the ECD is applied to an electronic watch, the enabling of the additional electrode 11 may be controlled in a digital fashion. A constant power supplier for the additional electrode 11 can be used also as a constant power supplier for bleaching the ECD.

EXAMPLE 3

Using the ECD similar to that shown in Example 1, the potentiostatic driving is effected, where the potential of the counter electrode including the conductive layer 3 is −0.6 V with respect to the reference electrode 4. The current is conducted from the additional electrode 11 to the counter electrode. This driving is referred to a reverse potentiostatic driving hereinbelow. The reverse potentiostatic driving is that the electrochromic layer of the counter electrode is colored in accordance with the potentiostatic driving.

Figure 8:
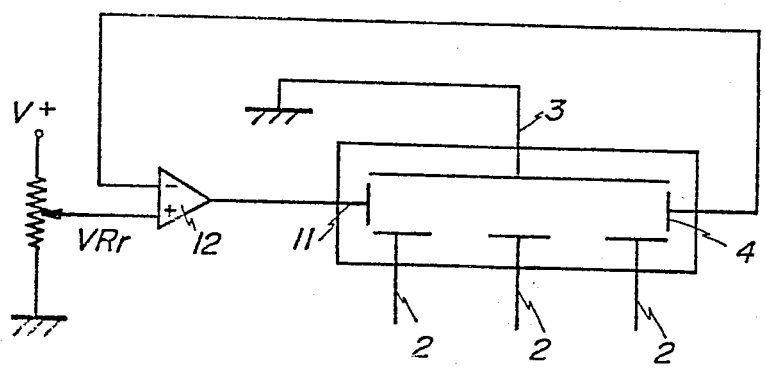
FIG. 8 is a circuit configuration of a driving circuit of the present invention, wherein current is conducted from the additional electrode to a counter electrode through the application of a potentiostatic voltage; this is called a reverse potentiostatic driving.

FIG. 8 shows a driving circuit for achieving the reverse potentiostatic driving, where the counter electrode including the conductive layer 3 is grounded and an operational amplifier is referred to the numeral 12. Current is conducted within one minute of the driving at an amount of 10 mC·cm$^{-2}$ to be balanced without any current. The electrochromic layer 7' of the counter electrode is colored enough to exhibit the above-mentioned superior electro-optical properties.

EXAMPLE 4

Using the ECD as shown in Example 1, Mg is substituted for Al in the additional electrode 11. The initial stabilization is effected by electric conduction between the counter electrode and the additional electrode 11. The electrochromic layer 7' deposited on the conductive layer 3 is clearly colored when the additional electrode 11 of Mg is used rather than that of Al. The good electro-optical properties are examined in the ECD using the additional electrode 11 made of Mg.

EXAMPLE 5

According to the ECD of a type of Example 1, any one of Zn, Cr, Fe, Ni, Sn, ane Pb may be a substitute for Al in the additional electrode 11. Although the initial stabilization is not enough by short-circuiting the counter electrode to the additional electrode 11 because of the deficiency of the coloration of the electrochromic layer 7', upon a cycle of the writing-in and the bleaching of the ECD with the conduction therebetween, the good electro-optical properties of the ECD are assured through several times to several hundreds of repetitions.

The reason is that the current is effected from the additional electrode 11 to the display electrode with the high overvoltage of the electrochromic layer 7' such that the display electrode is not sufficiently colored. In this case, when the display electrode is bleached, the current from the display electrode is therefor lead into the counter electrode, only the partial amount from the display electrode coloring the counter electrode. Then the electrochromic layer 7' of the counter electrode is further colored to thereby yield a low overvoltage. If the electrochromic layer 7' of the counter electrode is enough colored enough, the right amount of current is conducted from the counter electrode to the display electrode for driving purposes.

EXAMPLE 6

In accordance with the ECD of Example 1, each of Zn, Cr, Ee, Ni, Sn, Pb, Ag, Au, Pd, Pt, In$_2$O$_3$, and SnO$_2$ is replaced for Al in the additional electrode 11. The initial stabilization is effected by conducting between the counter electrode and the additional electrode 11 similar to Example 2. The good electro-optical properties are recognized in a manner similar to Example 2.

EXAMPLE 7

Using the ECD shown in Example 5, the initial stability is effected in a manner similar to Example 3 to thereby also obtain the good electro-optical properties.

EXAMPLE 8

In the above-mentioned Examples 1 through 7, a conductive film made of In$_2$O$_3$ is provided under the additional electrode 11. The initial stabilization is effected similar to that of Examples 1 through 7. The good electro-optical properties of the ECD are also obtained. The material of the conductive film can be any one of Ag, Au, Pt, Pb, and SnO$_2$.

In Examples 1 through 7, there are defects that, owing to the continuous or repeated conduction of the additional electrode 11, the additional electrode 11 may be shaped to an island form because the oxidation and the solution of the additional electrode 11 occur at random. However, because the conductive film has a small ionization tendency, the additional electrode 11 is available for use through even though the oxidation and the solution of the additional electrode 11 (which has a high ionization tendency) are non-uniform.

EXAMPLE 9

Figure 9:
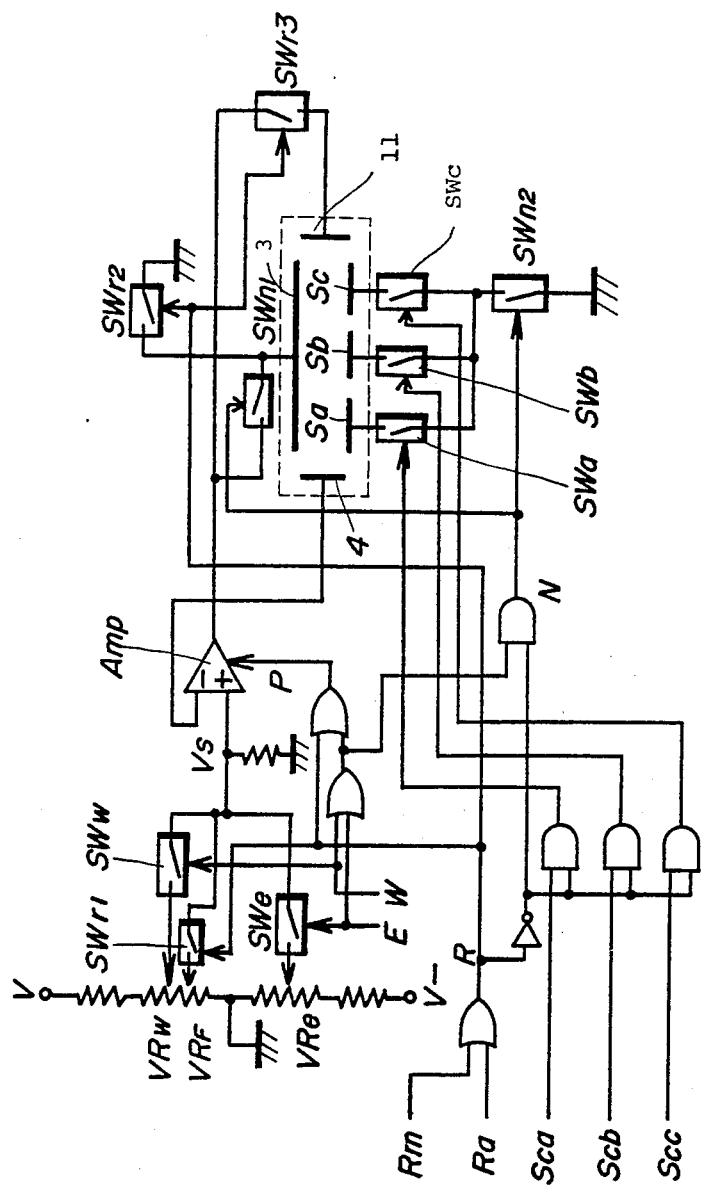
FIG. 9 is a circuit configuration of another reverse potentiostatic driving circuit.
Figure 10:
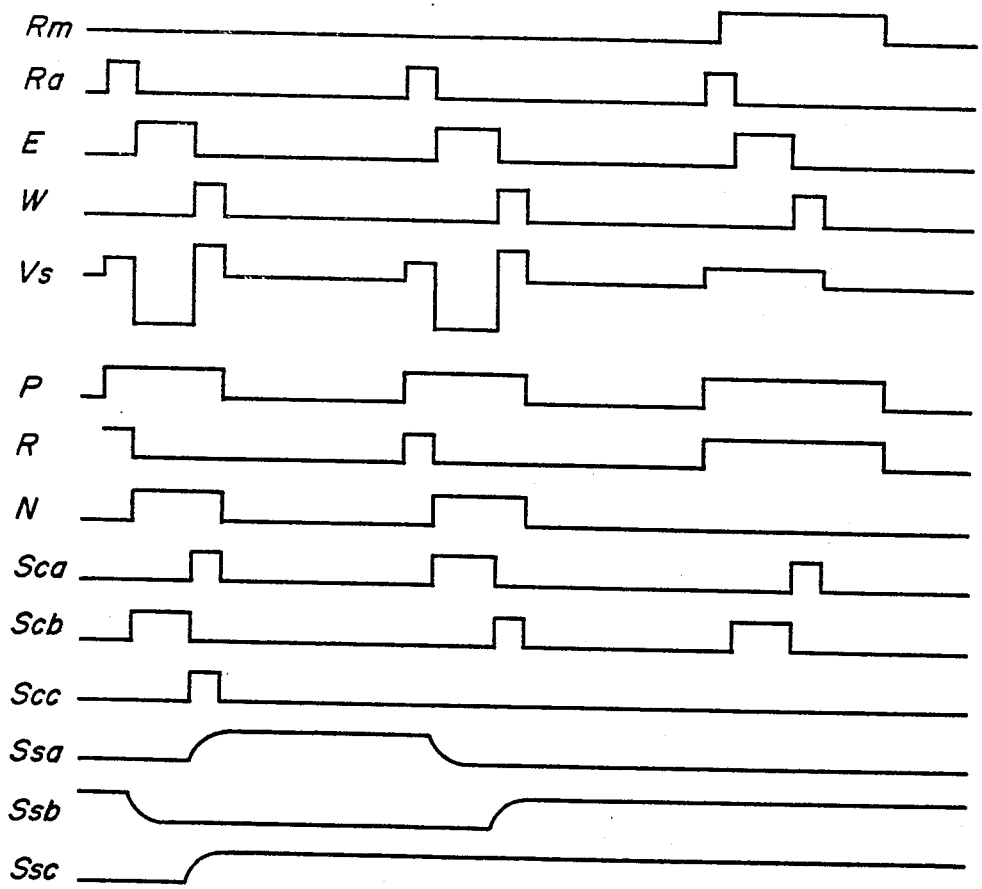
FIG. 10 is a time chart showing various signals occurring within the reverse potentiostatic driving circuit shown in FIG. 9.

Using the ECD described in Example 8, the reverse potentiostatic driving is effected for 500 msec immediately before the writing-in of the ECD. FIG. 9 illustrates a driving circuit and FIG. 10 shows a time chart of various signals occurring in the driving circuit shown in FIG. 9.

The driving circuit shown in FIG. 9 comprises three electronic switchings SWr1, SWr2 and SWr3, all activated for coloring the electrochromic layer 7' of the counter electrode. The switching SWr1 is provided for introducing to a normal input of an operation amplifier Amp a set voltage Vs applied for the reference electrode 4. The switching SWr2 is provided for grounding the electrochromic layer 7'. the switching SWr3 is provided for coupling the additional electrode 11 to the output of the operation amplifier Amp. Switchings SWn1 and SWn2 are connected to be turned ON when the normal potentiostatic driving is effected to color and bleach the display electrode of the ECD.

The switching SWn1 is adapted to connect the counter electrode to the output of the operation amplifier Amp. The switching SWn2 is adapted to ground the display electrode. A plurality of display segments, for example, Sa, Sb, and Sc are colored and bleached in response to the control of respective segment selection switchings SWa, SWb, and SWc. The display segments Sa, Sb, and Sc can maintain the memory function. The display segments Sa, Sb and Sc are related to the display electrode. A bleaching signal is referred to E and a coloration, namely, writing-in signal is denoted as W. A reverse potentiostatic driving enabling signal R makes the switching SWr1, SWr2, and SWr3 turned ON through the high level thereof. The set voltage VS is determined to enable the reference electrode 4 to active for the normal potentiostatic driving. The set voltages VS emerges is through the use of switchings SWe, SWw, and SWr1 in response to the signals E, W and R.

Voltages for the switchings SWe, SWw, and SWr1 are selected by variable resistors VRe, VRw, VRf. A signal P is provided by the addition of the signals E, W, and R. The operation amplifier Amp is operated only upon the high level of the signal P.

As will noted from the above, the operation amplifier Amp is a programmable amplifier, which normally amplifies the input when signal P reaches the high level. In response to the low level of the signal P, the operation amplifier Amp terminates its amplification of the input, whereby the input and the output of the operation amplifier Amp exhibit high impedance without any power dissipation in the operation amplifier Amp itself.

A normal potentiostatic driving enabling signal is denoted as N. Upon the high level of the normal potentiostatic driving enabling signal N, switching SWn1 and SWn2 are turned ON. Segment selection switching control signals Sca, Scb, and Scc control the respective switchings SWa, SWb, and SWc through AND gates which have the reverse voltage of the reverse potentiostatic driving enabling signal R. The control signals Sca, Scb, and Scc become the high level only when the respective display elements Sa, Sb and Sc are changed in these coloration conditions. When the display segments Sa, Sb and Sc are varied from the coloration to the bleaching, the control signals Sca, Scb, and Sca become the high level in synchronization with the bleaching signal E. Similarly, when they are colored from the bleaching, they exhibit the high level in synchronization with the writing-in signal W.

This is called partial erasure driving which was disclosed in U.S. Patent Application Ser. No. 898,121 "DRIVING TECHNIQUE FOR ELECTROCHROMIC DISPLAYS OF THE SEGMENTED TYPE" filed on Apr. 20, 1978 by H. Uede et al and assigned to the assignee of the present invention. The corresponding West German Patent Application No. P 26 57 760.6 was filed on Dec. 20, 1976.

A positive power source $V_+$ and a negative power source $V_-$ are provided for determining the set voltage Vs. The power sources $V_+$ and $V_-$ can be common to the power source for the operation amplifier Amp. To establish the stable operation of the ECD, the power sources $V_+$ and $V_-$ may be stabilized. The power sources $V_+$ and $V_-$ may have negative temperature dependence to compensate for the temperature dependence of the ECD.

The reverse potentiostatic driving enabling signal R is an addition of signals Ra and Rm. The signal Ra has, as shown in FIG. 10, a period similar to the bleaching signal E and the writing-in signal W. The signal Ra serves to recover the coloration condition of the electrochromic layer 7' of the counter electrode in accordance with the reverse potentiostatic driving immediately before the bleaching signal E occurs. The signal Rm bears the high level at a predetermined time in response to, for example, an external manual switching.

The signal Rm has advantages in the following points. The coloration of the electrochromic layer 7' of the display electrode is reduced under high temperature. In usual temperature, the memory function of the ECD is damaged for a long time. The high level of the signal Rm, selected by the manual switch for a predetermined time, refreshes the coloration of the electrochromic layer 7' of the counter electrode to provide the good electro-optical properties of the ECD. The recoloration of the electrochromic layer 7' of the counter electrode is established under the reverse potentiostatic driving to be completed over a short time period.

In the normal potentiostatic driving method enabling signal N is represented by the formula of $(E+W)\cdot\overline{R}$. The enabling signal N become the high level for the normal potentiostatic driving to thereby cause the switching SWn1 and SWn2 to be turned ON. In contrast, in the reverse potentiostatic driving, the enabling signal N becomes the low level to thereby make the switching SWn1 and SWn2 turned OFF.

In FIG. 10, the coloration conditions of the display segments Sa, Sb and Sc are represented by lines Ssa, Ssb, and Ssc, where the high level of the lines Ssa, Ssb, and Ssc are related to the coloration of the respective display segments Sa, Sb and Sc and, on other hand, the low level of the same are related to the bleaching thereof.

Referring now to FIGS. 9 and 10, the reverse potentiostatic driving of the ECD is described below.

The signals Ra, E, and W have a common period each other. When the ECD is applied to an electronic timepiece for indicating minutes and hours without seconds, the common period is selected to be one minute. For example, the width of the pulses of the signals Ra, E and W is 250 msec, 500 msec, 250 msec, respectively. Of course the width of the pulses of these signals is dependence from the electro-optical properties of the ECD.

The order of the application of the signals Ra, E, and W, as described in FIG. 10, is that the first is the signal Ra, the second is E, and then the third is the signal W after the memory time, where all the signals Ra, E, and W are low. The order is preferable to the ECD because the reverse potentiostatic driving should be enabled before the application of the signal W to minimize the variation of the coloration gradation of the display segments Sa, Sb and Sc. It is also preferable that the application of the bleaching signal E is forward to that of the writing-in signal W since the bleaching signal E effects the coloration of the counter electrode. Further, if the bleaching signal E is applied and separated from the writing-in signal W, a long time is required for determining the gradation of the coloration of the ECD. It is preferable that the bleaching signal E is not separated from the writing-in signal W. The control of the coloration of the ECD is completed in accordance with the combination of the three signals Ra, E, and W.

Assuming that the signal Ra bears the high level signal, the switching Swr1 is turned ON in response to the high level of the signal and a positive voltage selected by means of the variable resistor VRF is introduced into the operational amplifier Amp as the set voltage Vs. This voltage is approximately 0.2—1.5 V. The operation amplifier Amp is selected to be operative when energized by the high level of the signal P. The signal R of the high level makes the switching SWr2 and SWr3 turned ON to thereby ground the counter electrode and then introduce the additional electrode 11 to the output of the operation amplifier Amp. Therefore, the coloration of the counter electrode is initiated in accordance with the reverse potentiostatic driving. The enabling signal N becomes low when the signal R maintains the high level and the switchings SWn1 and SWn2 are turned OFF. The switching SWa, SWb, and SWc are turned OFF to make the ECD available to the reverse potentiostatic driving. No change of the coloration of the display in the ECD occurs in the reverse potentiostatic driving.

Thereafter, assuming that the bleaching signal E becomes high, the set voltage Vs is changed to a negative voltage of $-0.5$ to $-2.5$ V for the bleaching purposes. The normal potentiostatic driving occurs since the signals P and N become both the high level. In synchronization with the bleaching signal E, the segment selection switching control signals Sca, Scb, and Scc become high for bleaching purposes only. In the display segments Sa, Sb, and Sc which are not bleached, the relevant segment selection switching control signals Sca, Scb, and Scc are retained at the low level thereof.

Finally, assuming that the writing-in signal W is changed high, the set voltage Vs becomes a positive voltage of 0.2 to 2.0 V determined by the variable resistor VRW. The normal potentiostatic driving occurs since the signals P and N are high upon the high level of the writing-in voltage.

The segment selection switching control signals Sca, Scb, and Scc corresponding to the display segments Sa, Sb and Sc to be colored become the high level in synchronization with the writing-in signal W for the writing-in purposes. Since the coloration of the counter electrode has been completed in accordance with the signals Ra and E, only a small difference in color gradation between the previously colored display segments and now colored display segments is exhibited to achieve the good electro-optical properties of the ECD.

The signal Rm is adapted to refresh the coloration of the counter electrode of the ECD, when the signal Ra can not enable the coloration of the same, because the ECD has been damaged, for example, when disposed in high temperatures for a long period of time.

The normal potentiostatic driving can not be dependent on the conditions of the counter electrode in principle. However, when a plurality of the display segments are provided within the ECD, the variation of the color gradation of the display segments are shown in the partial erasure driving. The maintenance of the coloration of the counter electrode reduced the variation in color gradation to a negligible extent in practice.

Figure 11:
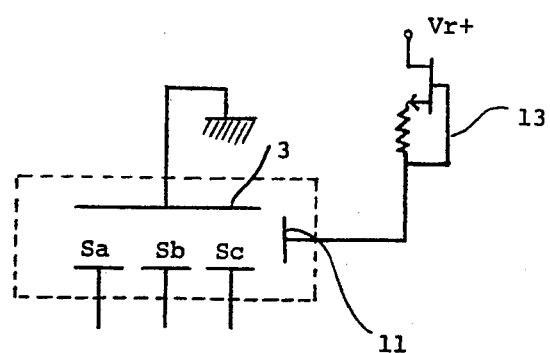
FIG. 11 is a circuit configuration of a constant current driving circuit according to the present invention.

The coloration of the counter electrode can be obtained in accordance with the constant current driving. FIG. 11 shows such a driving circuit in principle. Like elements corresponding to those of FIG. 9 are indicated by like numerals. A constant current source is denoted as the numeral 13. A set voltage Vr+ is pre-determined for coloring the counter electrode.

The coloration of the counter electrode including the conductive layer 3 is performed by conducting a predetermined charge for a predetermined time between the counter electrode (including the conductive layer 3) and the additional electrode 11. A small amount of current, for example, $0.1 \, m\mu$ may continuously flow for this objective. Otherwise, current pulses of a greater amount can be applied thereto.

Figure 12:
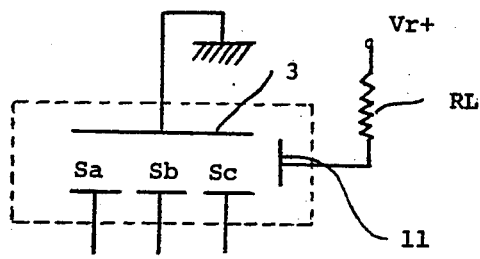
FIG. 12 is a circuit configuration of a constant voltage driving circuit according to the present invention.

Similarly, the coloration of the counter electrode can be obtained in terms of the constant voltage driving. FIG. 12 illustrates such a driving circuit in principle. Like element corresponding to those of FIG. 11 are indicated by like numerals. A resistor RL is provided for restricting the current applied to the additional electrode. The coloration of the counter electrode is affected in accordance with a driving method similar to FIG. 12.

As described above, in accordance with the present invention, firstly the reduction of a driving voltage for the writing-in purposes is achieved and secondly the gradation of the coloration of the display electrode becomes uniform without regard to the variation of the area of the display electrode. The latter is especially remarkable using the constant voltage driving method.

Further, with respect to the partial erasure driving, in the conventional ECD, the gradation of the coloration of the display electrode is inevitably caused. When the coloration of the electrochromic layer of the counter electrode is not complete in the conventional ECD, the display segments are subsequently colored with a constant driving voltage (potential) for a constant driving time. Since the overvoltage of the electrochromic layer of the counter electrode is increased in accordance with the proceeding of such driving, the gradation of the coloration of the display electrode, when subsequently activated becomes shallower. Even if the display electrodes are included within a simple digit, a variation of the gradation in the color colored display electrode is the result.

However, according to the present invention, the above-mentioned disadvantages are eliminated to a great extent and the variation of the in the color gradation of the colored display electrodes as substantially eliminated in practice.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electrochromic display cell comprising:
   a pair of electrodes, one of said pair functioning as a counter electrode, the other of said pair functioning as a display electrode;
   at least one layer of electrochromic material disposed between said counter electrode and said display electrode;
   additional electrode means for establishing a unidirectional current path leading from said additional electrode means to the layer of electrochromic material so that the electrochromic layer may retain a low overvoltage, said current path between said additional electrode means and said layer of electrochromic material being independent of a current path extending between said pair of electrodes; and
   an electrolyte filled between the electrodes.

2. The electrochromic display cell according to claim 1, wherein said additional electrode means comprises an inert material relative to the electrolyte, a metal of appropriate ionization tendency relative to the electrolyte, and a material including a combination of the inert materials and the metals.

3. The electrochromic display cell according to claim 2, wherein the inert material is selected from the group consisting of Ag, Au, Pt, Pd, $In_2O_3$, and $SnO_2$, and
   wherein the metal of appropriate ionization tendency is selected from the group consisting of Mg, Al, Zn, Cr, Fe, Ni, Sn, and Pb.

4. The electrochromic display cell according to claim 1, further comprising a conductive layer in contact with the additional electrode means, the conductive layer having a smaller ionization tendency than the ionization tendency of said additional electrode means.

5. The electrochromic display cell according to claim 1, further comprising reference electrode means for detecting the voltage potential of the layer of electrochromic material.

6. An electrochromic display cell comprising:
   a pair of electrodes, one of said pair being a counter electrode, the other of said pair being a display electrode;
   at least one layer of electrochromic material disposed between the counter electrode and the display electrode;
   a reference electrode means for detecting the voltage potential of the electrochromic material;
   additional electrode means for establishing a unidirectional current path leading from said additional electrode means to the layer of the electrochromic material so that the electrochromic layer may retain a low overvoltage, the current path being independent of a current path extending between the pair of electrodes; and an electrolyte filled between the electrodes.

7. A driving method for driving an electrochromic display cell including a pair of electrodes, a layer of electrochromic material disposed between the pair of the electrodes, an additional electrode, and an electrolyte filled between the electrodes, the driving method comprising the step of:

establishing a current path from the additional electrode to the layer of the electrochromic material in one direction so that the electrochromic layer retains a low overvoltage, the current path being independent of a current path extending between the pair of electrodes.

8. The driving method according to claim 7, wherein the step of establishing a current path further comprises the step of short-circuiting the additional electrode to the layer of electrochromic material.

9. The driving method according to claim 7, wherein the additional electrode is formed of an inert material relative to the electrolyte, a metal of appropriate ionization tendency relative to the electrolyte, and a material including a combination of the inert material and the metal.

10. The driving method according to claim 9, wherein the inert material is selected from the group consisting of Ag, Au, Pt, Pd, $In_2O_3$ and $SnO_2$, the metal of the appropriate ionization tendency being selected from the group consisting of Mg, Al, Zn, Cr, Fe, Ni, Sn, and Pb.

11. The driving method according to claim 7, further comprising the step of forming a conductive layer in contact with the additional electrode, the conductive layer having a smaller ionization tendency than the ionization tendency of said additional electrode.

12. The driving method according to claim 7, wherein said electrochromic display cell further includes a reference electrode means for detecting the voltage potential of the electrochromic material.

13. The driving method according to claim 7, wherein the step of establishing a current path further comprises the step of applying a constant voltage between the additional electrode and the layer of electrochromic material.

* * * * *